US010190762B2

(12) United States Patent
Dau et al.

(10) Patent No.: US 10,190,762 B2
(45) Date of Patent: Jan. 29, 2019

(54) DEVICES FOR WORKSPACE ILLUMINATION HAVING A PANEL FORMING AN ENCLOSURE AND A PLURALITY OF LIGHT EMITTERS WITH PRIMARY AND SECONDARY OPTICS

(71) Applicant: Quarkstar LLC, Las Vegas, NV (US)

(72) Inventors: Wilson Dau, Victoria (CA); Ingo Speier, Saanichton (CA); Ferdinand Schinagl, North Vancouver (CA); Edgar R. Velasquez, Daly City, CA (US)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 15/688,648

(22) Filed: Aug. 28, 2017

(65) Prior Publication Data

US 2018/0202646 A1    Jul. 19, 2018

Related U.S. Application Data

(63) Continuation of application No. 14/427,956, filed as application No. PCT/US2013/059489 on Sep. 12, 2013, now Pat. No. 9,746,173.
(Continued)

(51) Int. Cl.
*F21S 8/02* (2006.01)
*F21V 33/00* (2006.01)
(Continued)

(52) U.S. Cl.
CPC ............ *F21V 33/006* (2013.01); *F21S 8/024* (2013.01); *F21S 8/033* (2013.01); *F21V 7/0008* (2013.01);
(Continued)

(58) Field of Classification Search
CPC ....... F21W 2131/402; F21W 2131/301; F21W 2131/40; F21S 8/024; F21Y 2101/02; F21V 33/0066
See application file for complete search history.

(56) References Cited

U.S. PATENT DOCUMENTS 2,194,841 A    3/1940   Welch
2,626,120 A    1/1953   Baker
(Continued)

FOREIGN PATENT DOCUMENTS

CA    2702690 A1    11/2010
DE    19917401 A1   10/2000
(Continued)

OTHER PUBLICATIONS

Philips Lighting Company, "Philips EnduraLED Candle LED Lamps", Downloaded from the Internet at: www.lighting.philips.com/us_en/browseliterature/download/p-6027 on Jan. 27, 2012, 2 pages. (2010).
(Continued)

*Primary Examiner* — Robert J May
(74) *Attorney, Agent, or Firm* — Fish & Richardson P.C.

(57) ABSTRACT

Devices used for workspace illumination include, for example, a panel and a solid-state based optical system arranged inside an enclosure of the panel. The panel can be a cubicle divider. In one aspect, an illumination device includes a mount; a panel including a first face and a second opposing face. The panel is vertically supported by the mount along a horizontal dimension of the first and second faces. Further, the panel forms an enclosure between the first and the second face. Additionally, the illumination device includes a first luminaire module arranged in the enclosure and configured to output light in a first output angular range.
(Continued)

The light output in the first output angular range has a prevalent propagation direction with a vertical component towards a first target area.

12 Claims, 10 Drawing Sheets

Related U.S. Application Data

(60) Provisional application No. 61/700,674, filed on Sep. 13, 2012, provisional application No. 61/791,436, filed on Mar. 15, 2013.

(51) Int. Cl.

| | | |
|---|---|---|
| *F21S 8/00* | (2006.01) | |
| *F21V 7/00* | (2006.01) | |
| *F21V 8/00* | (2006.01) | |
| *F21V 13/04* | (2006.01) | |
| F21W 131/402 | (2006.01) | |
| F21V 29/76 | (2015.01) | |
| F21Y 103/10 | (2016.01) | |
| F21Y 115/10 | (2016.01) | |

(52) U.S. Cl.
CPC ............ *F21V 7/0033* (2013.01); *F21V 13/04* (2013.01); *G02B 6/0031* (2013.01); *G02B 6/0045* (2013.01); *G02B 6/0076* (2013.01); *G02B 6/0095* (2013.01); F21V 29/763 (2015.01); F21W 2131/402 (2013.01); F21Y 2103/10 (2016.08); F21Y 2115/10 (2016.08)

(56) References Cited

U.S. PATENT DOCUMENTS

| | | |
|---|---|---|
| 3,592,289 A | 7/1971 | Aysta |
| 3,772,506 A | 11/1973 | Junginger |
| 3,836,767 A | 9/1974 | Lasker |
| 4,112,483 A | 9/1978 | Small et al. |
| 4,240,692 A | 12/1980 | Winston |
| 4,254,456 A | 3/1981 | Grindle et al. |
| 4,271,408 A | 6/1981 | Teshima et al. |
| 4,358,817 A | 11/1982 | Bielemeier |
| 5,075,827 A | 12/1991 | Smith |
| 5,134,550 A | 7/1992 | Young |
| 5,289,356 A | 2/1994 | Winston |
| 5,436,805 A | 7/1995 | Hsu et al. |
| 5,438,485 A | 8/1995 | Li et al. |
| 5,810,463 A | 9/1998 | Kawahara et al. |
| 5,868,489 A | 2/1999 | Fuller et al. |
| 5,988,836 A | 11/1999 | Swarens |
| 6,058,271 A | 5/2000 | Tenmyo |
| 6,234,643 B1 | 5/2001 | Lichon |
| 6,241,369 B1 | 6/2001 | Mackiewicz |
| 6,250,019 B1 | 6/2001 | Simons |
| 6,273,577 B1 | 8/2001 | Goto et al. |
| 6,350,041 B1 | 2/2002 | Tarsa et al. |
| 6,441,943 B1 | 8/2002 | Roberts et al. |
| 6,505,953 B1 | 1/2003 | Dahlen |
| 6,527,420 B1 | 3/2003 | Chuang |
| 6,540,373 B2 | 4/2003 | Bailey |
| 6,543,911 B1 | 4/2003 | Rizkin et al. |
| 6,572,246 B1 | 6/2003 | Hopp et al. |
| 6,598,998 B2 | 7/2003 | West et al. |
| 6,834,979 B1 | 12/2004 | Cleaver et al. |
| 6,880,963 B2 | 4/2005 | Luig et al. |
| 6,932,499 B2 | 8/2005 | Ogura |
| 7,083,315 B2 | 8/2006 | Hansler et al. |
| 7,097,337 B2 | 8/2006 | Kim et al. |
| 7,134,768 B2 | 11/2006 | Suzuki |
| 7,156,540 B2 | 1/2007 | Haines |
| 7,164,842 B2 | 1/2007 | Chen |
| 7,182,480 B2 | 2/2007 | Kan |
| 7,259,403 B2 | 8/2007 | Shimizu et al. |
| 7,275,841 B2 | 10/2007 | Kelly |
| 7,286,296 B2 | 10/2007 | Chaves et al. |
| 7,290,906 B2 | 11/2007 | Suzuki et al. |
| 7,293,889 B2 | 11/2007 | Kamiya |
| 7,331,691 B2 | 2/2008 | Livesay et al. |
| 7,334,932 B2 | 2/2008 | Klettke |
| 7,341,358 B2 | 3/2008 | Hsieh et al. |
| 7,386,214 B1 | 6/2008 | Cianciotto |
| 7,387,399 B2 | 6/2008 | Noh et al. |
| 7,434,951 B2 | 10/2008 | Bienick |
| 7,530,712 B2 | 5/2009 | Lin et al. |
| 7,645,054 B2 | 1/2010 | Goihl |
| 7,850,347 B2 | 12/2010 | Speier et al. |
| 7,855,815 B2 | 12/2010 | Hayashide et al. |
| 7,942,546 B2 | 5/2011 | Naijo et al. |
| 7,947,915 B2 | 5/2011 | Lee et al. |
| 7,967,477 B2 | 6/2011 | Bloemen et al. |
| 8,002,446 B1 | 8/2011 | Plunk et al. |
| 8,006,453 B2 | 8/2011 | Anderson |
| 8,042,968 B2 | 10/2011 | Boyer et al. |
| 8,061,867 B2 | 11/2011 | Kim et al. |
| 8,068,707 B1 | 11/2011 | Simon |
| 8,075,147 B2 | 12/2011 | Chaves et al. |
| 8,192,051 B2 | 6/2012 | Dau et al. |
| 8,348,489 B2 | 1/2013 | Holman et al. |
| 8,506,112 B1 | 8/2013 | Dau et al. |
| 8,573,823 B2 | 11/2013 | Dau et al. |
| 8,602,586 B1 | 12/2013 | Dau et al. |
| 8,740,407 B2 | 6/2014 | Kotovsky et al. |
| 8,833,969 B2 | 9/2014 | Speier et al. |
| 8,833,996 B2 | 9/2014 | Dau et al. |
| 8,899,808 B2 | 12/2014 | Speier |
| 2002/0181229 A1 | 12/2002 | Wei |
| 2003/0117798 A1 | 6/2003 | Leysath |
| 2004/0012976 A1 | 1/2004 | Amano |
| 2004/0080947 A1 | 4/2004 | Subisak et al. |
| 2004/0105264 A1 | 6/2004 | Spero |
| 2004/0120160 A1 | 6/2004 | Natsume |
| 2004/0137189 A1 | 7/2004 | Tellini et al. |
| 2004/0208019 A1 | 10/2004 | Koizumi |
| 2004/0228131 A1 | 11/2004 | Minano et al. |
| 2004/0257803 A1 | 12/2004 | Kermoade |
| 2005/0057922 A1 | 3/2005 | Herst et al. |
| 2005/0063169 A1 | 3/2005 | Erber |
| 2005/0111235 A1 | 5/2005 | Suzuki et al. |
| 2005/0185416 A1 | 8/2005 | Lee et al. |
| 2005/0207177 A1 | 9/2005 | Guy |
| 2005/0243570 A1 | 11/2005 | Chaves et al. |
| 2005/0265044 A1 | 12/2005 | Chen et al. |
| 2005/0270774 A1 | 12/2005 | Pan |
| 2005/0276566 A1 | 12/2005 | Iimura |
| 2006/0002678 A1 | 1/2006 | Weber et al. |
| 2006/0061990 A1 | 3/2006 | Chinniah et al. |
| 2006/0076568 A1 | 4/2006 | Keller et al. |
| 2006/0098444 A1 | 5/2006 | Petruzzi |
| 2006/0139917 A1 | 6/2006 | Ward |
| 2006/0164839 A1 | 7/2006 | Stefanov |
| 2006/0187661 A1 | 8/2006 | Holten |
| 2007/0047228 A1 | 3/2007 | Thompson et al. |
| 2007/0061360 A1 | 3/2007 | Holcombe et al. |
| 2007/0081360 A1 | 4/2007 | Bailey |
| 2007/0097696 A1 | 5/2007 | Eng et al. |
| 2007/0201234 A1 | 8/2007 | Ottermann |
| 2007/0280593 A1 | 12/2007 | Brychell et al. |
| 2008/0074752 A1 | 3/2008 | Chaves et al. |
| 2008/0080166 A1 | 4/2008 | Duong et al. |
| 2008/0170398 A1 | 7/2008 | Kim |
| 2008/0192458 A1 | 8/2008 | Li |
| 2008/0198603 A1 | 8/2008 | Sormani et al. |
| 2009/0103293 A1 | 4/2009 | Harbers et al. |
| 2009/0168395 A1 | 7/2009 | Mrakovich et al. |
| 2009/0201698 A1 | 8/2009 | Klick et al. |
| 2009/0231831 A1 | 9/2009 | Hsiao |
| 2009/0231878 A1 | 9/2009 | Van Duijneveldt |
| 2009/0316414 A1 | 12/2009 | Yang |
| 2010/0058372 A1 | 3/2010 | Smirnov |
| 2010/0063838 A1 | 3/2010 | Schumacher |
| 2010/0085773 A1 | 4/2010 | Richardson |

(56) References Cited

U.S. PATENT DOCUMENTS

| | | |
|---|---|---|
| 2010/0220497 A1 | 9/2010 | Ngai |
| 2011/0063870 A1 | 3/2011 | Nomoto et al. |
| 2011/0103067 A1 | 5/2011 | Ago et al. |
| 2011/0164398 A1 | 7/2011 | Holten et al. |
| 2011/0175533 A1 | 7/2011 | Holman et al. |
| 2011/0182084 A1 | 7/2011 | Tomlinson |
| 2011/0199005 A1 | 8/2011 | Bretschneider et al. |
| 2011/0227487 A1 | 9/2011 | Nichol et al. |
| 2011/0234121 A1 | 9/2011 | Ding et al. |
| 2011/0235318 A1 | 9/2011 | Simon |
| 2011/0267836 A1 | 11/2011 | Boonekamp et al. |
| 2011/0273900 A1 | 11/2011 | Li et al. |
| 2011/0286200 A1 | 11/2011 | Iimura |
| 2012/0020066 A1 | 1/2012 | Chang |
| 2012/0044675 A1 | 2/2012 | Buelow et al. |
| 2012/0069595 A1 | 3/2012 | Catalano |
| 2012/0099310 A1 | 4/2012 | Kropac et al. |
| 2012/0147624 A1 | 6/2012 | Li et al. |
| 2012/0155110 A1 | 6/2012 | Pijlman et al. |
| 2012/0155116 A1 | 6/2012 | Gardner |
| 2012/0170260 A1 | 7/2012 | Gardner |
| 2012/0236586 A1 | 9/2012 | Wang |
| 2012/0250346 A1 | 10/2012 | Williams |
| 2012/0268966 A1 | 10/2012 | McCollum et al. |
| 2012/0281432 A1 | 11/2012 | Parker et al. |
| 2012/0294037 A1 | 11/2012 | Holman et al. |
| 2013/0039050 A1 | 2/2013 | Dau et al. |
| 2013/0039090 A1 | 2/2013 | Dau et al. |
| 2013/0201715 A1 | 8/2013 | Dau et al. |
| 2013/0208495 A1 | 8/2013 | Dau et al. |
| 2013/0272015 A1 | 10/2013 | Weaver |
| 2014/0104868 A1 | 4/2014 | Speier et al. |
| 2014/0126235 A1 | 5/2014 | Speier et al. |
| 2014/0192558 A1 | 7/2014 | Dau et al. |
| 2014/0226360 A1 | 8/2014 | Krijn |

FOREIGN PATENT DOCUMENTS

| | | |
|---|---|---|
| DE | 102011001769 A1 | 10/2012 |
| EP | 1182395 A1 | 2/2002 |
| EP | 2163701 A1 | 3/2010 |
| EP | 2196725 A1 | 6/2010 |
| EP | 2264359 A1 | 12/2010 |
| EP | 2439564 A1 | 4/2012 |
| FR | 2784739 A1 | 4/2000 |
| FR | 2934353 A1 | 1/2010 |
| JP | 2010192119 A1 | 9/2010 |
| WO | WO2001007828 A1 | 2/2001 |
| WO | WO2003009012 A1 | 1/2003 |
| WO | WO2005073629 A1 | 8/2005 |
| WO | WO2005090854 A1 | 9/2005 |
| WO | WO2008007315 A1 | 1/2008 |
| WO | WO2008047278 A1 | 4/2008 |
| WO | WO2008139383 A1 | 11/2008 |
| WO | WO2009000536 A1 | 12/2008 |
| WO | WO2009105168 A1 | 8/2009 |
| WO | WO2010042423 A1 | 4/2010 |
| WO | WO2010079391 A1 | 7/2010 |
| WO | WO2010113091 A1 | 10/2010 |
| WO | WO2011112914 A1 | 9/2011 |
| WO | WO2012024607 A1 | 2/2012 |
| WO | WO2012093126 A1 | 7/2012 |
| WO | WO2012131560 A1 | 10/2012 |
| WO | WO2012176352 A1 | 12/2012 |
| WO | WO2013023008 A1 | 2/2013 |
| WO | WO2013066822 A1 | 5/2013 |
| WO | WO2013154835 A1 | 10/2013 |

OTHER PUBLICATIONS http://www.everlight.com/datasheets/OL-Flat_Series_Data_Sheet_v5.pdf, "Datasheet: Office Lighting Flat Luminaire Series", product catalog, Everlight, Issue No. DBM-0000054_v5, May 5, 2011, pp. 1-5.
Notification of Transmittal of the International Search Report and the Written opinion of the International Searching Authority, International Application No. PCT/US13/59489, dated Mar. 28, 2014, 9 pages.

DEVICES FOR WORKSPACE ILLUMINATION HAVING A PANEL FORMING AN ENCLOSURE AND A PLURALITY OF LIGHT EMITTERS WITH PRIMARY AND SECONDARY OPTICS

CROSS-REFERENCE TO RELATED APPLICATIONS

This application is a continuation of U.S. patent application Ser. No. 14/427,956, filed Mar. 12, 2015, which is a U.S. National Stage of International Application No. PCT/US2013/059489, filed Sep. 12, 2013, which claims benefit under 35 U.S.C. § 119(e)(1) of U.S. Provisional Application No. 61/700,674, filed Sep. 13, 2012, and U.S. Provisional Application No. 61/791,436, filed Mar. 15, 2013, the entire contents of which are incorporated by reference herein.

TECHNICAL FIELD

The present disclosure relates to devices used for workspace illumination, for example illumination devices that include a panel and a solid-state based optical system arranged inside or outside an enclosure, such as an office cubicle, formed by the panel.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and light-emitting diodes (LEDs).

SUMMARY

The present disclosure relates to illumination devices configured to provide illumination of target areas. The illumination devices can be included with or configured for modular attachment to partition walls, panels, dividers or other elements that can be used to outline cubicles, rooms or room-like spaces, or other spaces. The disclosed illumination devices are also referred to as devices for workspace illumination. A device for workspace illumination can include a panel and multiple light-emitting elements (LEEs) and redirecting optics. The LEEs and the redirecting optics can be arranged inside or outside an enclosure formed by the panel. For example, the LEEs and the redirecting optics can be part of one or more luminaire modules that are arranged in the panel or configured as a module for attachment to the panel. The panel can have opposing flat surfaces that are arranged in an upright, vertical set up.

Panels of the disclosed illumination devices typically have a height that is less than the height of the ceiling of the space in which they are set up. The height can vary depending on the level of privacy desired for the users of the space. For example, they can be at a height that allows a standing person to see into the enclosure (e.g., about four to five feet tall), or may be taller, providing a privacy barrier from people standing nearby. The devices for workspace illumination can be configured to provide light on one or both faces of the panels, for example from one or more portions of a face adjacent to or remote of edges thereof or other locations. For example, where a panel is shared by adjacent office cubicles, the illumination device can provide illumination to both cubicles.

The disclosed illumination devices generally include redirecting optics configured to manipulate light provided by the multiple LEEs. The LEEs can include LEDs, for example solid-state LEDs. In general, the redirecting optics include primary optics (e.g., parabolic, elliptical, conical optical couplers) that redirect light emitted by the LEEs to secondary optics, which in turn output the light into a range of angles. In some implementations, the redirecting optics include one or more light guides that guide light from the primary optics to the secondary optics. The components of a device for workspace illumination can be configured in a variety of ways to output various intensity distributions for workspace illumination. In this manner, the device for workspace illumination can be configured to provide direct illumination for a target area, such as a desk or other workspace, in the vicinity of the device.

In one aspect, an illumination device includes a mount; a panel including a first face and a second opposing face forming an enclosure, the first and second faces extending in a first direction and a second direction perpendicular to the first direction, where, when mounted to a floor, the mount supports the panel so that the first direction is a vertical direction and the second direction is a horizontal direction; and a first luminaire module arranged within the enclosure and configured to direct light from the panel in a first output angular range, where the light in the first output angular range has a prevalent propagation direction with a component in the first direction towards a first target area, where the first luminaire module includes first light-emitting elements (LEEs) distributed along the second direction, the first LEEs configured to emit light in a first emission angular range; first primary optics coupled with the first LEEs and configured to redirect light emitted by the first LEEs as redirected light in a first collimated angular range; and a first secondary optic elongated along the second direction and comprising a first redirecting surface and a first output surface, the first redirecting surface arranged and configured to reflect the light received from the first primary optics as reflected light in a first reflected angular range, and the first output surface arranged and configured to transmit the reflected light and to output the transmitted light towards the first target area.

The foregoing and other embodiments can each optionally include one or more of the following features, alone or in combination. In some embodiments, the illumination device further includes a first light guide elongated along the second direction and disposed between the first primary optic and the first secondary optic, where the first light guide can be configured to receive the redirected light and guide at least some of the received light along the first direction of the first light guide and provide the guided light at a distal end of the first light guide to the first secondary optic.

In some implementations, the illumination device further includes a second luminaire module arranged in the enclosure that can be configured to output light in a second output angular range, where the light output in the second output angular range has a prevalent propagation direction with a component in the first direction towards a second target area, where the second luminaire module can include second LEEs distributed along the second direction, the second LEEs configured to emit light in a second emission angular range;

second primary optics coupled with the second LEEs that can be configured to redirect light emitted by the second LEEs as redirected light in a second collimated angular range; and a second secondary optic elongated along the second direction and including a second redirecting surface and a second output surface, where the second redirecting surface can be arranged and configured to reflect the light received from the second primary optics as reflected light in a second reflected angular range, and the second output surface can be arranged and configured to transmit the reflected light and to output the transmitted light towards the second target area.

In some implementations, the illumination device further includes a second light guide elongated along the second direction and disposed between the second primary optic and the second secondary optic, where the second light guide can be configured to receive the redirected light and guide at least some of the received light along the first direction and provide the guided light at a distal end of the second light guide to the second secondary optics. In some implementations, the first and second LEEs can be powered independently.

In some implementations, the first luminaire module can further output light in a second output angular range, where the light output in the second output angular range can have a prevalent propagation direction with a component towards a second target area, and the first secondary optic of the first luminaire module further includes a second redirecting surface and a second output surface, where the second redirecting surface can be arranged and configured to reflect the light received from the first primary optics as reflected light in a second reflected angular range, and the second output surface can be arranged and configured to refract the reflected light and to output the refracted light towards the second target area.

In some implementations, the first face of the panel can include a first aperture located proximate a distal end of the panel with respect to a portion of the mount along the second direction, and where the light that is output by the first luminaire can pass through the first aperture towards the first target area. In some implementations, the first aperture can be elongated along the second direction.

In some implementations, the second face of the panel can include a second aperture located proximate a distal end of the panel with respect to a portion of the mount along the second direction, where the light that is output in the second output angular range can pass through the second aperture towards the second target area. In some implementations, a thickness of the panel can be smaller than each of the second direction and the first direction of the first and second faces.

In some implementations, the panel can be at least a portion of one of a cubical wall, a desk partition, a room partition, a wall panel, or an element of a piece of furniture. In some implementations, the first aperture can include glass.

In some implementations, the first output angular range and the second output angular range can be mirror symmetrical with respect to a plane parallel to and between the first and second faces of the panel. In some implementations, a portion of the mount can be configured to couple to at least one element for separating spaces along the second direction. In some implementations, a portion of the mount can be configured to couple to a top of an element for separating spaces. In some implementations, the illumination device can be detachable from adjacent elements for separating spaces.

In another aspect, an illumination device includes a mount; a panel that includes a first face and a second opposing face forming an enclosure, the first and second faces extending in a first direction and a second direction perpendicular to the first direction, where, when mounted to a floor, the mount supports the panel so that the first direction is a vertical direction and the second direction is a horizontal direction; and multiple luminaire modules arranged in the enclosure, each luminaire module being configured to output light in a prevalent propagation direction with a component towards a respective target area, where each luminaire module includes multiple light-emitting elements (LEEs) distributed along the second direction, the multiple LEEs being configured to emit light; one or more primary optics coupled with one or more corresponding LEEs of the plurality of LEEs and configured to redirect light emitted by the one or more corresponding LEEs as redirected light; and a secondary optic elongated along the second direction that includes one or more redirecting surfaces and one or more output surfaces corresponding to the one or more redirecting surfaces, the one or more redirecting surface being arranged and configured to reflect the light received from the one or more primary optics as reflected light towards the corresponding one or more output surfaces, and the one or more output surfaces being arranged and configured to refract the reflected light and to output the refracted light towards the respective target area.

The foregoing and other embodiments can each optionally include one or more of the following features, alone or in combination. In some embodiments, at least some of the multiple luminaire modules can include a light guide elongated along the second direction and disposed between the primary optic and the secondary optic, the light guide can be configured to receive the redirected light and guide at least some of the received light along the first direction of the light guide and provide the guided light at a distal end of the light guide to the secondary optic.

In some implementations, some luminaire modules of the multiple luminaire modules can be configured and arranged to only output light towards a respective target area proximate to the first face of the panel and some luminaire modules of the multiple luminaire modules can be arranged to only output light towards a respective target area proximate to the second face of the panel. In some implementations, at least some luminaire modules of the multiple luminaire modules can be configured and arranged to output light towards respective target areas proximate to the first and the second face of the panel. In some implementations, the at least some luminaire modules can be configured to output the light towards the respective target area proximate to the first face of the panel in an angular range with different divergence and asymmetric prevalent propagation direction than an angular range of the light output towards the respective target area proximate to the second face of the panel.

In some implementations, power to the multiple LEEs of at least some luminaire modules of the multiple luminaire modules can be controlled independently to independently control a light output for each of the at least some luminaire modules. In some implementations, at least some of the multiple luminaire modules can be configured to output light downward within +/−40 degrees relative to the panel.

Among other advantages, embodiments of the illumination devices include a light source that is positioned inside or outside (e.g., coupled with) a panel and the light emitted by the light source is redirected towards a target area. Hence, the target area is illuminated without being exposed to direct light emission from the light source. When the illumination device is coupled with the panel via an interface (e.g., adjustable or fixed mounts) the distance of the illumination device to the panel can be adjusted dependent on the requirements of the application. Because of the targeted illumination (e.g., task light), the light power density (LPD) necessary to illuminate a target area can be reduced. The distribution of light that is output by the illumination device can be controlled to provide targeted horizontal and vertical illuminance of respective target areas.

Reference numbers and designations in the various drawings indicate exemplary aspects of implementations of particular features of the present disclosure.

DETAILED DESCRIPTION

The present disclosure relates to devices for workspace illumination that can be used as or in combination with partition walls, dividers or other elements that can be used to outline spaces such as cubicles, rooms or room-like spaces, or other spaces and to illuminate target areas, e.g., floors, desks, etc., within the cubicles, rooms, etc. A device for workspace illumination can include a panel used to provide the partition wall or a separate housing and multiple LEEs and redirecting optics arranged in an enclosure of the panel or the housing and configured to provide illumination on one or more target areas on one side or both sides of the panel. A panel typically has a height below that of the space in which it is set up. The height can vary depending on the level of privacy desired for the users of the space. The devices for workspace illumination can be configured to provide light from one or more portions of a panel face adjacent to or remote of edges, for example a top edge, thereof or other locations. The multiple LEEs may be enclosed within the partition walls and the light is directed to the target area via one or more optical elements.

In some implementations, the devices for workspace illumination are configured to allow interdependent as well as independent control of illuminations on one side, the other side or both sides of the panel, by a user.

Figure 1A:
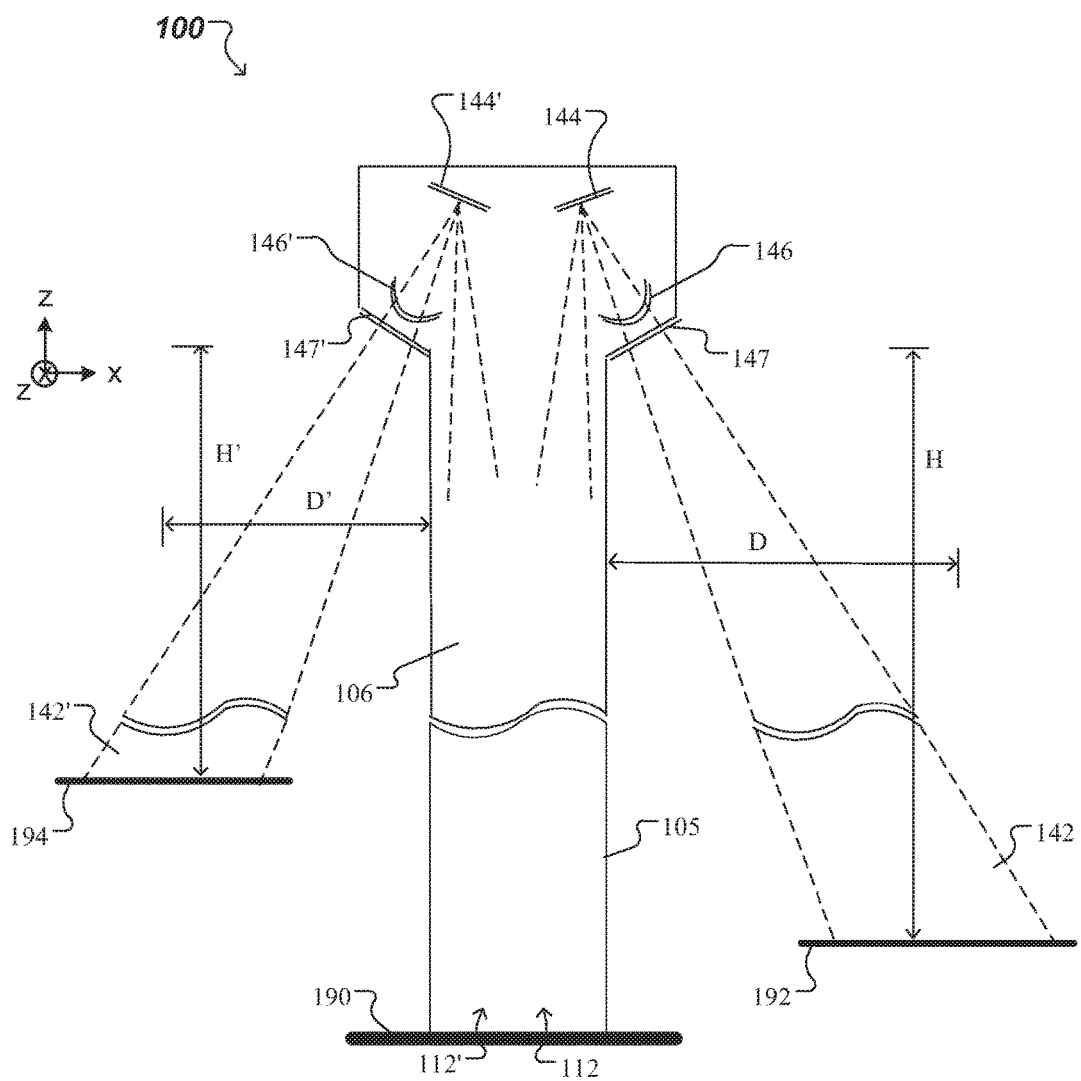
FIG. 1A shows a schematic cross-sectional view of an example of a device for workspace illumination.

FIG. 1A shows a schematic cross-sectional view of a device 100 for workspace illumination. A Cartesian coordinate system is shown for schematic reference. The device 100 includes a panel 105 and multiple LEEs coupled with redirecting optics to direct light emitted by the LEEs towards one or more target areas.

The multiple LEEs and the redirecting optics are arranged in an enclosure 106 formed by the panel 105 and are configured to output light in a first angular range 142, on one side of the panel 105, and optionally output light in a second angular range 142', on the opposite side of the panel 105. In this example, the device 100 is supported upright on a mount 190 (e.g., relative to the floor), with a face of the panel 105 along the z-axis, and elongated along the y-axis, perpendicular to the page. In this manner, the device 100 can illuminate a first target area 192 (e.g. a floor) in a first space separated from a second space by the panel 105 with light in the first angular range 142, and optionally a second target area 194 (e.g., a desk) in the second space with light in the second angular range 142'.

The light is output from the device 100 in the first angular range 142 through a first aperture 147 (e.g., a window). Similarly, the light optionally output from the device 100 in the second angular range 142' can be output through a second aperture 147' (e.g., a window). The first and second apertures 147, 147' can extend along the y-axis over a fraction or the entire length of the panel in the y-direction and are positioned along the z-axis to allow the output light to exit from the panel enclosure 106 substantially unobstructed. The first and second apertures 147, 147' can be openings or can be covered with a light-transmissive material (e.g., glass or plastic). In the latter case, the light-transmissive material stops dust, debris, etc. to enter the panel enclosure 106 and to contaminate the LEEs and/or the redirecting optics or other system components, for example. The light-transmissive material may be transparent or may be diffusely transmitting (e.g., homogenizing the light intensity along the length of the aperture).

Figure 1B:
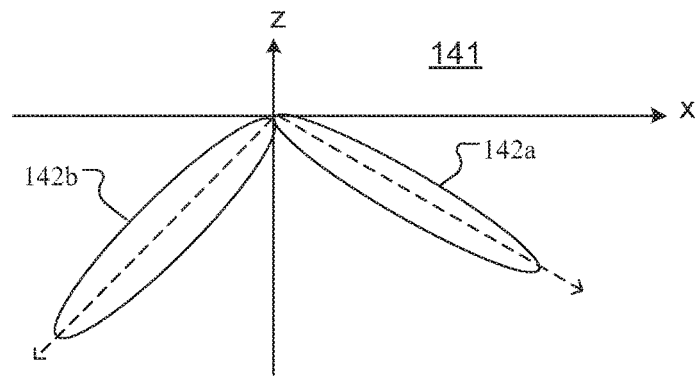
FIG. 1B shows an example of an intensity profile corresponding to the device for workspace illumination of FIG. 1A.

Referring to FIG. 1B, an example light intensity distribution profile 141, in x-z cross-section, includes two lobes 142a and 142b, which respectively correspond to angular ranges 142 and 142' identified in FIG. 1A. As described in detail below, composition and geometry of optical components of the device 100 can be selected to vary the relative orientation, solid angle, and intensity of the light intensity profile 141. For the example illustrated in FIG. 1B, the device 100 is configured to direct substantially all of the light 142a, 142b downwards into a range of polar angles between about 30° and about 120° clockwise relative to the positive x axis, in the x-z cross-sectional plane of the device 100. Generally, light intensity profile 141 can be substantially invariant along the y-axis (perpendicular to the sectional plane of FIG. 1A).

In some configurations, first LEEs 112 or second LEEs 112' of the LEEs of the device 100 can be dimmed, or turned off during operation, such that the device 100 outputs light in lobe 142a or 142b to output light substantially towards one or the other side of the panel 105, respectively.

In some implementations, the device 100 is configured to allow interdependent as well as independent control of the light output in the first angular range 142 and in the second angular range 142', by a user. The foregoing interdependent or independent control can be implemented by particular arrangements of the redirecting optics relative to the multiple LEEs, and by selectively turning on or off (or dimming) the first LEEs 112 or the second LEEs 112' of the multiple LEEs of the device 100.

In some implementations, multiple correlated color temperature (CCT) or other chromaticity LEEs can be included in the device 100. These multiple CCT LEEs can be controlled (e.g., certain ones of the multiple CCT LEEs may be selectively powered on/off, dimmed, etc.) to interpolate between the CCTs and intensity levels of the light output in the first angular range 142, or second angular range 142', or both angular ranges. In some implementations, the CCT corresponding to light output in the first and second angular ranges 142, 142' can be modified from a bluish to a reddish CCT throughout the day to accomplish certain bioluminous effects, for instance.

The device 100 can be configured to provide a particular light intensity distribution on the first target area 192 and/or on the second target area 194, subject to given constraints. For example, the device 100 can be configured to uniformly illuminate the first and second target areas 192, 194, and to be in conformance with glare standards. In some implementations, light output by the device 100 in any of the angular ranges 142, 142' does not exceed a glancing angle of 40° with respect to the z-axis, for example. Such configurations of the device 100 can be implemented by selecting appropriate combinations of device parameters such as (i) first and second angular ranges 142, 142' of light output by the device 100; (ii) distance D or D' between the device 100 and the first or second target area 192 or 194 (e.g., D and/or D'=3, 6, 10 ft); (iii) height H/H' from the first or second target area 192 or 194 to a level of the aperture 147 or 147' of the device 100 (e.g., H and/or H'=4, 6, 8 ft).

In some implementations, a power supply for the LEEs can be integrated with the panel 105 (e.g., placed in the panel enclosure) of the device for workspace illumination. The power supply can be an electrical outlet or a battery, for example. In some implementations, the power supply for the LEEs can be included with the mount. In some implementations, the power supply for the LEEs can be external to the device for workspace illumination.

Figure 1C:
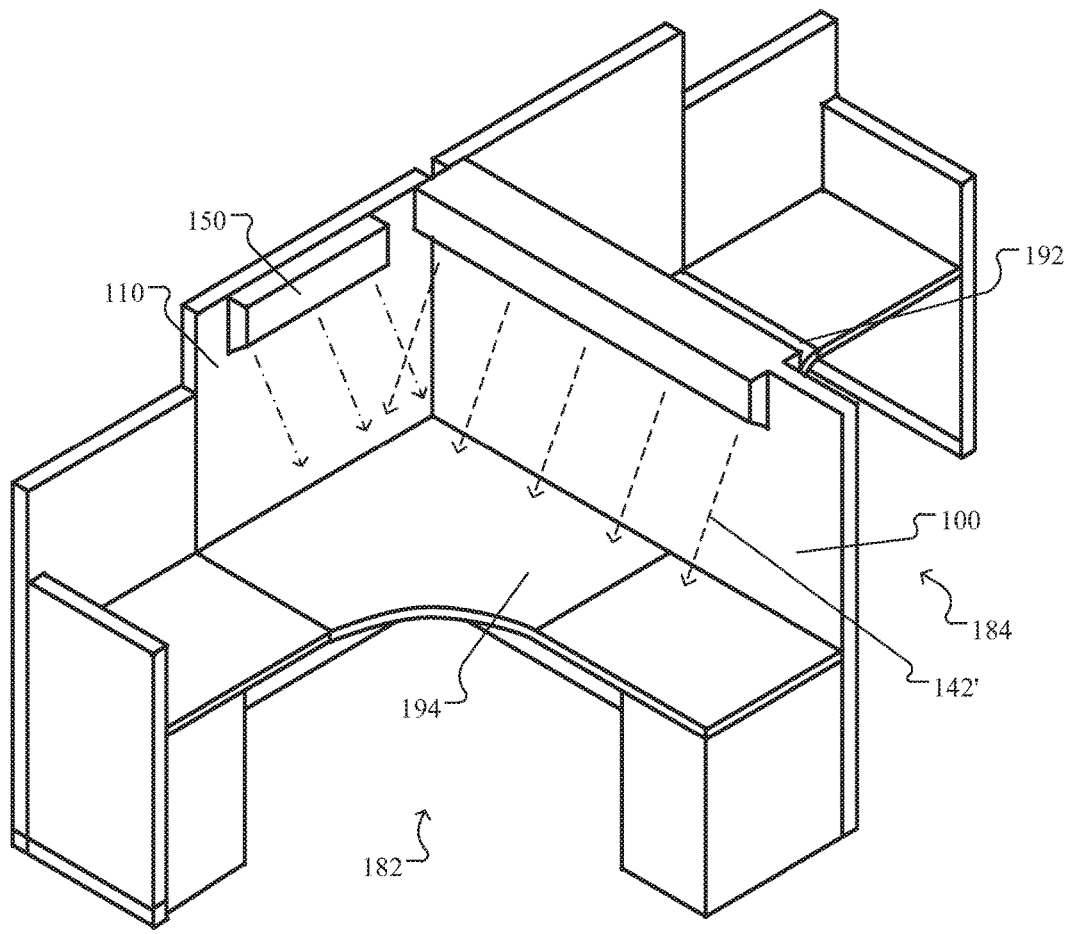
FIG. 1C shows an example of a device for workspace illumination implemented in adjacent office cubicles.

FIG. 1C shows an example of a device 100 for workspace illumination implemented in adjacent office cubicles. The device 100 separates two adjacent office cubicles 182 and 184 and is configured to illuminate the target areas 194 and 192 in the respective office cubicles 182 and 184. Several devices for workspace illumination can be integrated in an office cubicle. In some implementations, the device for workspace illumination can be an integral component, such as device 100, which includes the luminaire module(s) and the panel. In some implementations, the device for workspace illumination can be an add-on device, such as device 150, that can be coupled to a cubicle wall 110, for example.

Figure 2A:
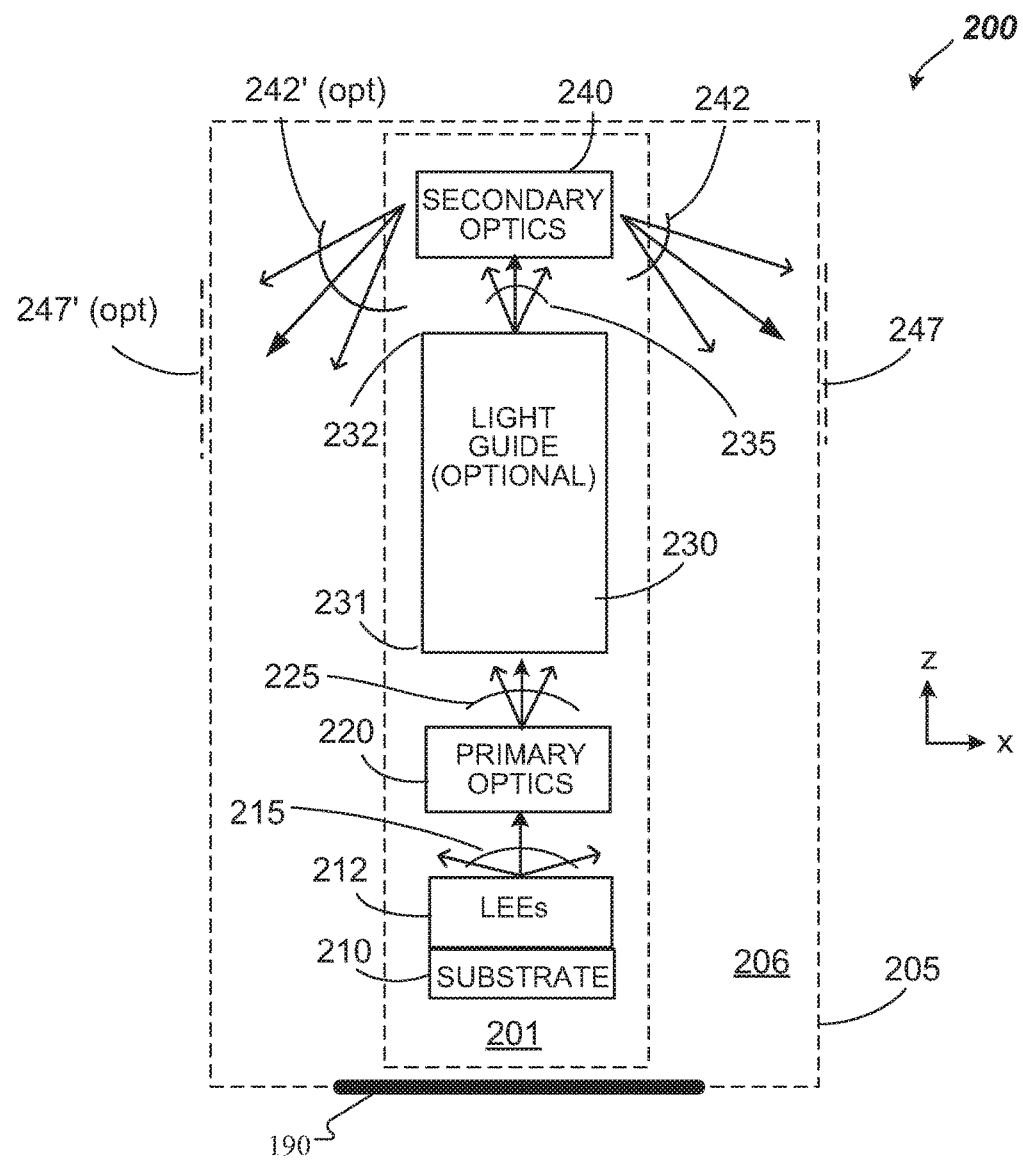
FIG. 2A shows a schematic representation of a luminaire module that is part of the device for workspace illumination of FIG. 1A.

FIG. 2A shows a schematic diagram of a device 200 that includes a panel 205 and a luminaire module 201 arranged inside an enclosure 206 formed by the panel 205. Device 200 can be configured as a separate module for attachment to a partition wall, cubicle wall, divider or other element for separating spaces, as described above. A Cartesian coordinate system is shown for reference. Here, parallel is defined to be along an axis in the positive (+) direction of the coordinate system, and antiparallel is defined to be along an axis in the negative (−) direction of the coordinate system. In this example, the coordinate system is oriented relative so that light output by the device 200 in first angular range 242 (and optionally in second angular range 242') has a prevalent propagation direction with a non-zero component that is antiparallel to the z-axis. As such, the device 200 can provide illumination of a first target area, located on one side of the panel 205, through a first aperture 247 (and optionally of a second target area, located on the other side of the panel 205, through a second aperture 247'.)

The luminaire module 201 includes a substrate 210 which supports multiple LEEs 212. The luminaire module 201 further includes primary optics 220, an optional light guide 230, and a secondary optic 240. The primary optics 220 can include one or more optical elements which couple light from LEEs 212 to light guide 230. Examples include concentrators, such as parabolic concentrators, which reflect light towards the light guide 230. Secondary optic 240 may include one or more reflectors which direct light from light guide 230, propagating substantially in the z-direction, toward apertures 247 and 247'.

The LEEs 212 emit light, during operation, in an emission angular range 215 with respect to their optical axes, which can be parallel with a normal to the surface of the substrate 210 (e.g., parallel to the z-axis). For example, a divergence of the emission angular range 215 of the light emitted by the LEEs 212 can be 150°-180° around optical axes of the LEEs 212. The primary optics 220 receive light from the LEEs 212. Each primary optic 220 is configured to redirect the received light into a light with a collimated angular range 225 and direct it into a first end 231 of light guide 230.

For example, a divergence of the collimated angular range 225 (i.e., the range of solid angles in the x-z plane) of the light provided by the primary optics 220 can be about 90° or less. The light guide 230 can guide the light to a distal end 232 of the light guide 230 away from LEEs 212. The light guide 230 provides the guided light at the distal end 232 in an angular range 235. In some implementations, the angular range 235 is substantially the same as the collimated angular range 225. The secondary optic 240 includes a reflective interface that reflects the light, which exits luminaire module 201 (indicated by arrows) with one or more angular output ranges 242, 242'. The angular output ranges 242, 242' at which light exits the secondary optic 240 can depend on the properties of the secondary optic 240 (e.g., geometry of the optical interfaces and optical properties of the materials forming the secondary optic 240). Various implementations of the components of the luminaire module 201 are described in detail herein.

While the device 200 includes a light guide 230, other implementations may not include a light guide. In such configurations, the primary optics 220 redirect the light with the collimated angular range 225 to the secondary optic 240.

Referring back to FIG. 1A, the LEEs 112 can be coupled with first redirecting optics and placed at a desired height (e.g., above or below the break line in the illustration of the panel 105) with respect to a horizontal portion of the mount 190 of the panel 105 as indicated by a corresponding arrow shown in FIG. 1A. The direction of the arrow corresponding to the LEEs 112 indicates that the LEEs 112 emit light in a first emission angular range oriented along the z-axis. Moreover, the LEEs 112 are distributed along the y-axis, over a fraction or the entire length of the panel in the y-direction. The first redirecting optics (also are elongated along the y-axis and) include reflecting optics 144 and optional refractive optics 146 arranged and configured to redirect the light emitted by the LEEs 112 in the first emission angular range and to provide the redirected light as output light of the device 100 in the angular range 142.

Optionally, the LEEs 112' can be coupled with second redirecting optics and placed at a desired height (e.g., above or below the break line in the illustration of the panel 105)

with respect to a horizontal portion of the mount 190 of the panel 105 as indicated by a corresponding arrow shown in FIG. 1A. The direction of the arrow corresponding to the LEEs 112' indicates that the LEEs 112' emit light in a second emission angular range oriented along the z-axis. Moreover, the LEEs 112' are distributed along the y-axis, over a fraction or the entire length of the panel in the y-direction. The second redirecting optics (also are elongated along the y-axis and) include reflecting optics 144' and optional refractive optics 146' arranged and configured to redirect the light emitted by the LEEs 112' in the second emission angular range and to provide the redirected light as output light of the device 100 in the angular range 142'.

In some implementations, the LEEs 112' and the second redirecting optics can be arranged and configured to form a second luminaire module. In some implementations, the LEEs 112, 112' and the first and second redirecting optics can be arranged and configured to form a single luminaire module.

Figure 2B:
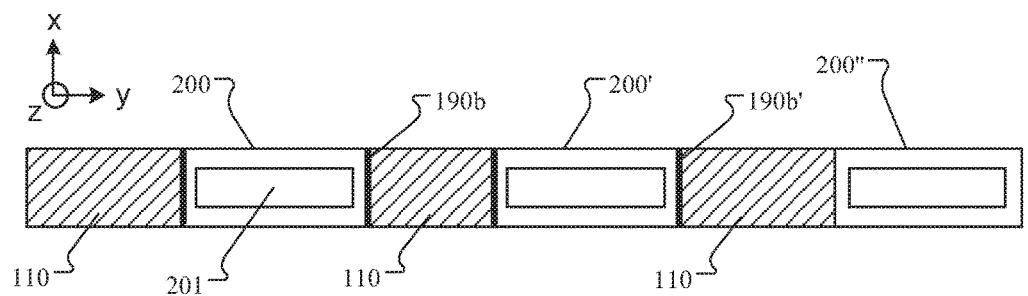
FIGS. 2B-2C show another example of a modular device for workspace illumination.
Figure 2C:
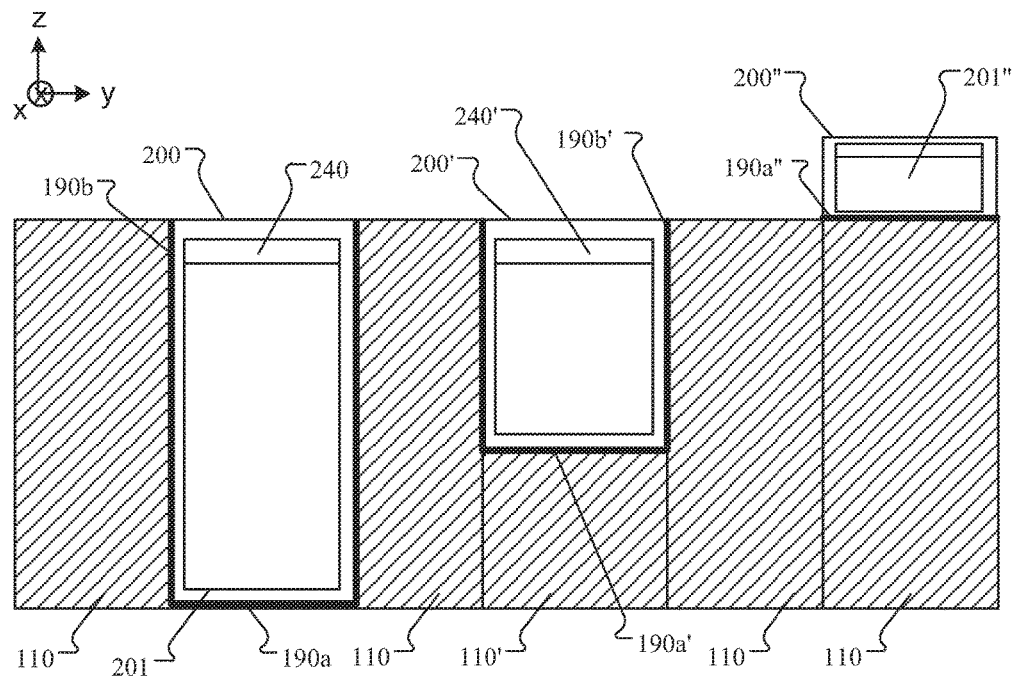

While the device 200 itself can be arranged to separate spaces, the device 200 can also be configured as a module and coupled to one or more elements 110 for separating spaces (e.g. partition walls, cubicle walls, or dividers) as shown in FIGS. 2B and 2C (e.g., as detachable snap on devices). The device 200 includes a mount 190 and luminaire module 201 to provide illumination for at least some of the separated spaces that are defined by the elements 110 and/or the device 200. The mount 190 can be configured to couple the device 200 to one or more elements 110 along a horizontal dimension (e.g., 190a, 190a', 190a") of the device 200, along a vertical dimension (e.g., 190b, 190b') of the device 200, or both. In some implementations, the mount 190 can be a frame, fasteners, hooks, brackets, or a combination thereof.

FIG. 2B shows devices 200, 200', and 200" coupled with three elements 110. In this example, vertical portions 190b and 190b' of the mounts couple the devices 200 and 200' to the corresponding elements 110. In some implementations, a device for workspace illumination can be placed on top of an element 110. FIG. 2C shows an example of devices 200' and 200" that are placed on top of corresponding elements 110' and 110. In this example, horizontal portions 190a' and 190a" of the respective mounts couple the devices 200' and 200" to corresponding elements 110' and 110. In some implementations, devices 200 can be spaced apart from the element 110, for example via a fixed or adjustable mount.

The luminaire modules can vary in size and configuration. For example, a luminaire module can occupy an entire panel enclosure of a device for workspace illumination or only a portion thereof.

In general, luminaire modules are configured to generate light of a desired chromaticity. In many applications, luminaire modules are configured to provide broadband white light. Broadband light can be generated using nominally white or off-white LEEs or colored LEEs whose emissions are mixed to provide white light. Alternatively, or additionally, white light can be generated using a LEE configured to emit pump light (e.g., blue, violet or ultra-violet light) in conjunction with a wavelength conversion material. For example, in certain implementations, LEEs include GaN-based pump LEDs with an overlying phosphor layer (e.g., YAG) that creates yellow, red and/or green components to produce white light. Such phosphor conversion LEDs can be included in different configurations in some implementations. For example, some implementations can include 3000 K CCT white LEEs and 2700 K white LEEs that can be independently controlled to maintain a desired CCT between about 2700 K and about 3000 K to mitigate ageing effects, drift or other effects, or to allow a user to vary the CCT within a respective CCT range.

In some implementations, luminaire modules may be configured to provide colored light (e.g., yellow, red, green, blue light). Different LEEs in the luminaire modules and/or different luminaire modules in a device for workspace illumination may be configured to emit nominally different light under operating conditions, for example yellow, red, green, blue, white or other color light.

In general, relatively energy efficient LEEs can be used. For example, LEEs can have an output efficiency of about 50 lm/W or more (e.g., about 75 lm/W or more, about 100 lm/W, about 125 lm/W or more, about 150 lm/W or more). In certain implementations, LEEs conduct current greater than about 350 mA (e.g., 75 mA, 100 mA, 200 mA, 400 mA or more, 450 mA or more, 500 mA or more). LEEs may be surface mount devices.

The number of LEEs per luminaire module can vary. In some implementations, the luminaire module can include relatively few LEEs (e.g., 10 or fewer). In some implementations, the luminaire module can include a large number of LEEs (e.g., 100 or more).

Figure 3A:
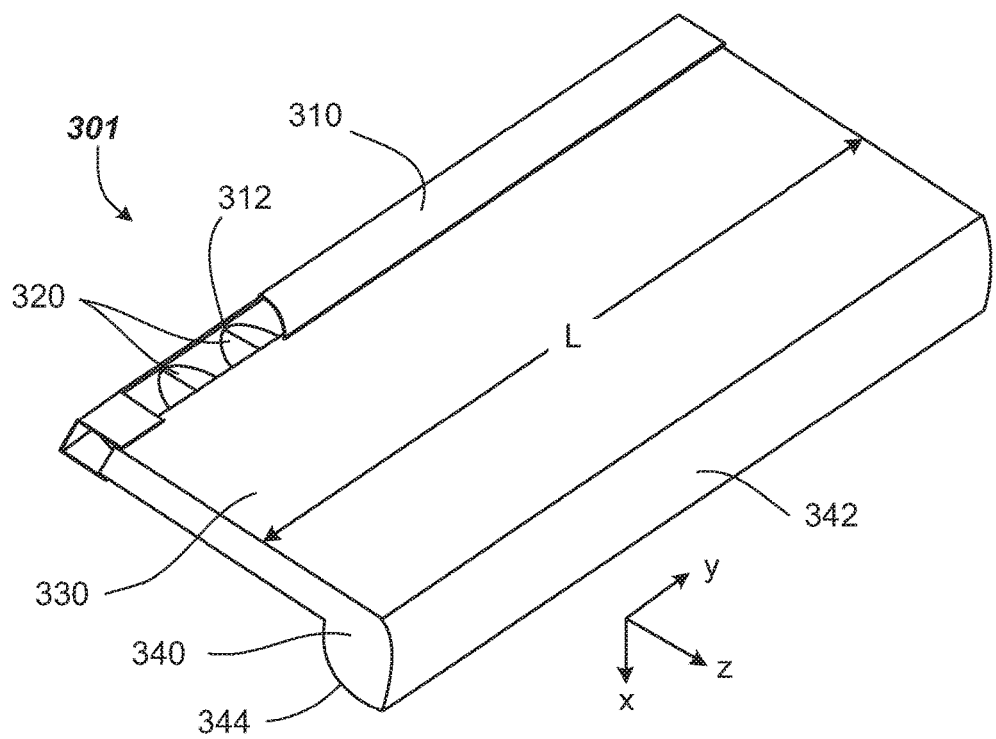
FIGS. 3A-3C show aspects of an example of a luminaire module.
Figure 3B:
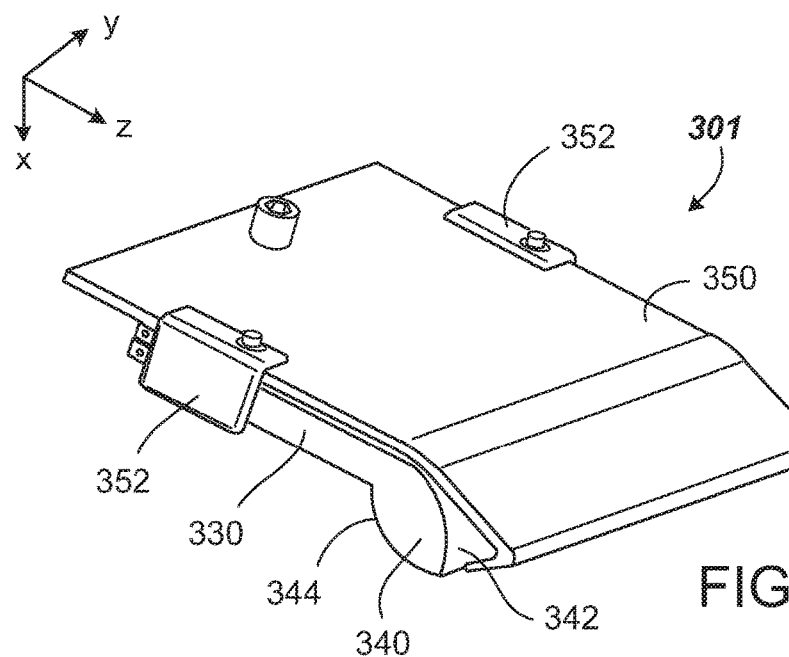
Figure 3C:
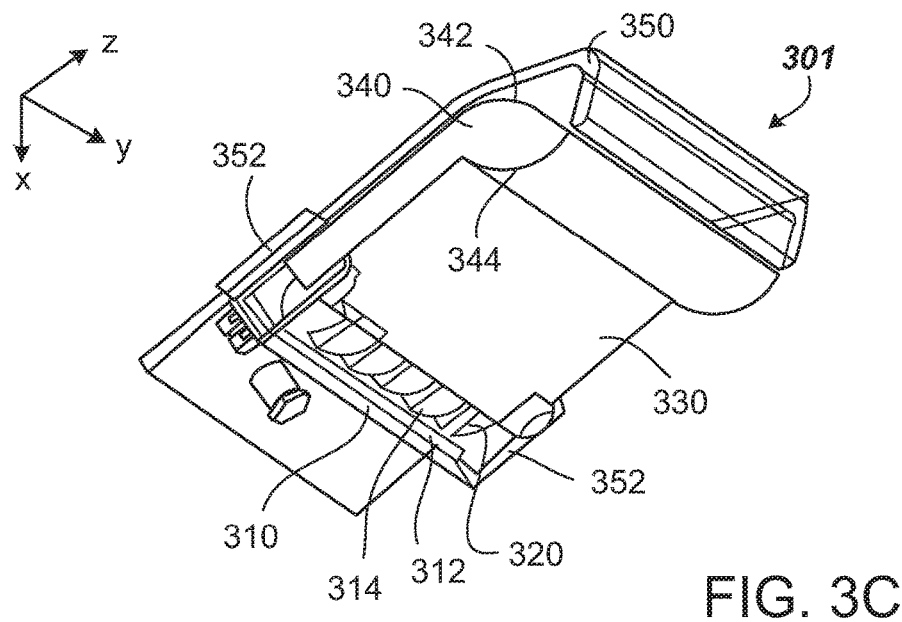

FIGS. 3A-3C show perspective views a luminaire module 301 configured to direct light to one side of relative to light guide 330. In this example, the luminaire module 301 is designed to direct light in the positive x-direction. The luminaire module 301 includes a mount 310 having a plurality of LEEs 312 distributed along the mount 310 in they direction. The luminaire module 301 includes primary optics 320 (e.g., optical couplers corresponding to the LEEs 312), the light guide 330, and a secondary optic 340 (e.g., an optical extractor). Light that is guided by the light guide 330 to the secondary optic 340 is first redirected by a redirecting surface 342 and then output from the optical extractor 340 of the luminaire module 301 through output surface 344. A mounting frame 350 and attachment brackets 352 (e.g., as shown in FIGS. 3B and 3C) can be used to position and/or attach the luminaire module inside a panel enclosure, such as panel enclosures 106 or 206, of a device for workspace illumination, for instance.

Further, in this example, the mount 310 holds the LEEs 312 and corresponding optical couplers 320 that are shaped to collimate light from LEEs 312 in two orthogonal planes. Depending on the implementation, the luminaire module 301 can include 6, 60, 600 or any other number of LEEs 312 along with corresponding primary optics 320, for example. A length of the light guide 330 along the z axis can be 0.1, 0.5, 1, or 2 meter, for instance. In cross-section, both the redirecting surface 342 and the output surface 344 of the secondary optics 340 can be concave (as viewed in the direction of propagation of light) in shape. The output surface 344 can have a constant or varying radius of curvature; like considerations apply to the curvature of the redirecting surface 342. In general, various geometries (shapes, compositions, etc.) of the primary and secondary optics can be used to tailor an (orientation and divergence of the) angular range of the light output by the luminaire module 301.

A luminaire module 301 can be used in a device for workspace illumination, such as devices 100 or 200, to output light from the device in one of a first or second angular range.

Two or more luminaire modules 301 can be used in the device for workspace illumination, such as devices 100 or 200, when light is output from the device in both, a first angular range and a second angular range. In this case, a first of the two or more luminaire modules can be oriented in a panel enclosure such that light output by the first luminaire module in the first angular range has a component parallel to the x-axis, and a second of the two or more luminaire modules is backing the first luminaire module in the panel enclosure such that light output by the second luminaire module in the second angular range has a component antiparallel to the x-axis.

Figure 4:
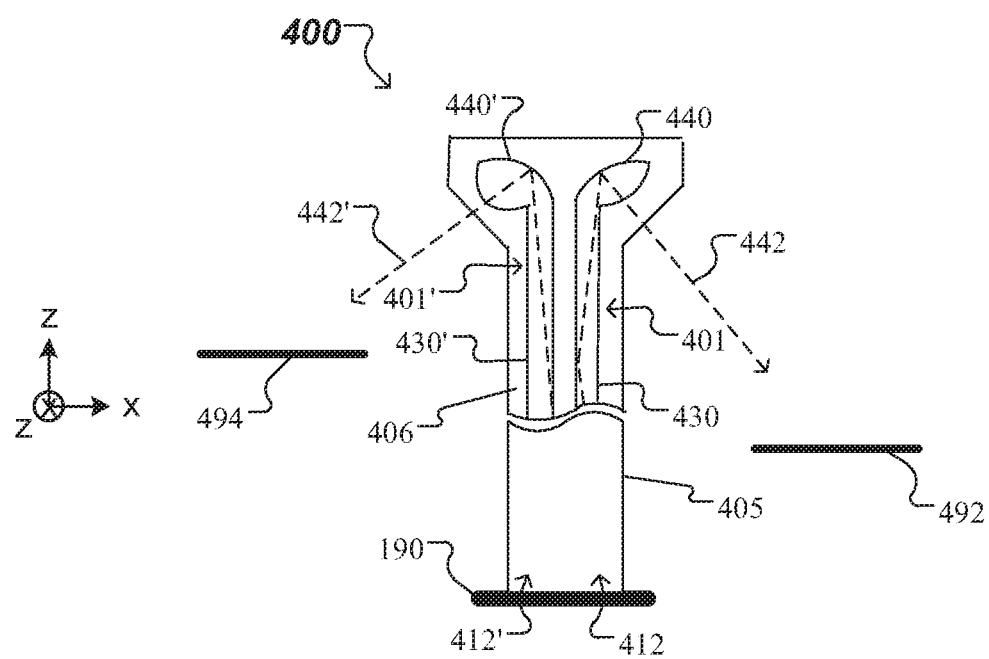
FIG. 4 shows a schematic cross-sectional view of another example of a device for workspace illumination.

FIG. 4 shows a schematic cross-sectional view of an example of a device 400 for workspace illumination that includes two or more luminaire modules 401 and 401', such as luminaire modules 301 and 301' as described above in connection with FIGS. 3A-3C. In this example, the two or more luminaire modules 401, 401' are arranged in a panel enclosure 406.

A Cartesian coordinate system is shown for schematic reference. In this example, the coordinate system is oriented relative to the device 400 such that the device 400 as well as the two or more luminaire modules 401, 401' therein are elongated along the y-axis, and light output by the device 400 in first angular range 442 (and optionally in second angular range 442') has a prevalent propagation direction with a non-zero component that is antiparallel to the z-axis. As such, the device 400 can provide illumination of a first target area 492, located on one side of the panel 405 (e.g., through a first aperture) and optionally of a second target area 494, located on the other side of the panel 405 (e.g., through a second aperture.) Generally, the first (or second) target area is spaced apart from the device 400.

The first/second luminaire module 401/401' includes one or more first/second LEEs 412/412' coupled with corresponding primary optics. The first/second luminaire module 401/401' also includes a first/second light guide 430/430' and a first/second secondary optic 440/440'. A length of the first/second light guide 430/430' along the z-axis can extend through most of the height of the panel 405 (e.g., from the level of the aperture(s) to a horizontal portion of the mount 190), or through a fraction of the height of the panel 405 (e.g., 25%, 50%, 75%.) As such, the first/second LEEs 412/412'of the first/second luminaire module 401/401' are represented in FIG. 4 by arrows corresponding to the LEEs 412/412', such that the direction of the corresponding arrows indicates that the first/second LEEs 412/412' emit light in a first/second emission angular range oriented along the z-axis.

In some implementations, both luminaire modules 401, 401' are included in the panel enclosure 406 of the device 400. Here, first and second angular ranges 442, 442' have different general orientations (in the directions of +/− x-axis, respectively). In some implementations, respective geometries of the primary and secondary optics of the luminaire modules 401, 401' can be selected such that the first and second angular ranges 442, 442' have different divergences and asymmetric prevalent propagation directions, for various illumination tasks on the two opposite sides of the device 400.

In some implementations, the respective geometries of the primary and secondary optics of the luminaire modules 401, 401' can be selected such that first and second angular ranges 442, 442' have equal divergences but asymmetric prevalent propagation directions, or different divergences but symmetric prevalent propagation directions, for various illumination tasks that are different on the two opposite sides of the device 400.

In some implementations, the respective geometries of the primary and secondary optics of the luminaire modules 401, 401' can be selected such that first and second angular ranges 442, 442' have equal divergences and symmetric prevalent propagation directions, for various illumination tasks that are similar on the two opposite sides of the device 400. In such cases, identical luminaire modules 401, 401' may be included in the panel enclosure 406 of the device 400, for instance.

In general, the geometric shape and dimensions of each of the two or more luminaire modules 401 and 401' can be similar or different (e.g., different size) to provide a desired illumination pattern for the corresponding target areas.

Further, in implementations that include both luminaire modules 401, 401' as illustrated in FIG. 4, the respective first and second LEEs 412, 412' can be powered independently. Thus, interdependent as well as independent control of light output by the device 400 in the first angular range 442 and in the second angular range 442' can be performed. The interdependent or independent control can be implemented by selectively turning on or off (or dimming) the first LEEs 412 of the first luminaire module 401 and/or the second LEEs 412' of the second luminaire module 401' of the device 400.

Figure 5A:
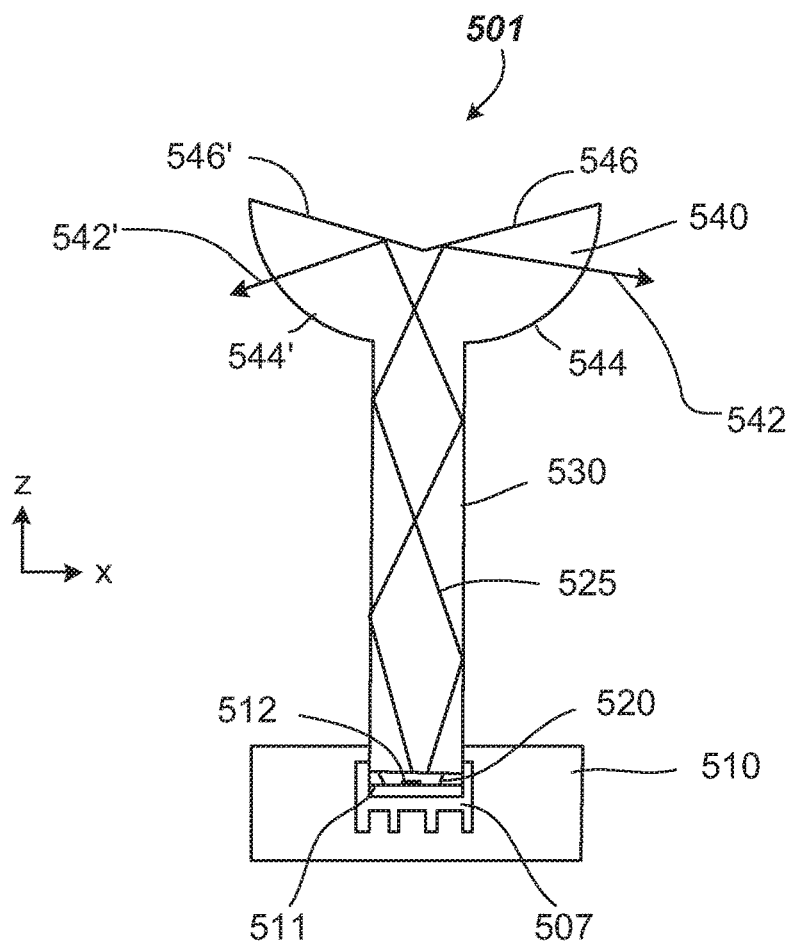
FIGS. 5A-5B show aspects of another example of a luminaire module.

FIG. 5A shows a cross-sectional view of an example of a luminaire module 501 configured to direct light to both sides of its light guide 530. The luminaire module 501 can be combined with a panel (not illustrated in FIG. 5A) and employed in a device for workspace illumination. A Cartesian coordinate system is shown for schematic reference. In this example, the coordinate system is oriented relative to the luminaire module 501 such that the luminaire module 501 is elongated along the y-axis, and light output by the luminaire module 501 in first and second angular ranges 542, 542' has a prevalent propagation direction with a non-zero component that is antiparallel to the z-axis.

Figure 5B:
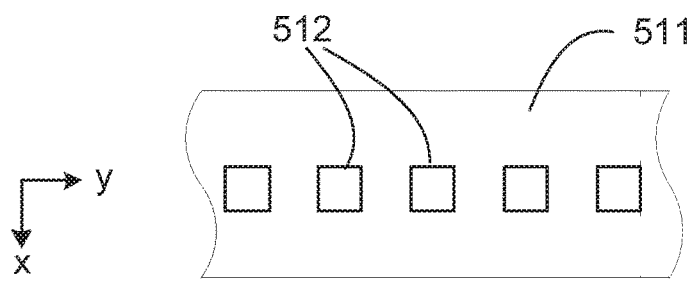

The luminaire module 501 includes a mount 510 and multiple LEEs 512. The mount 510 supports a substrate 511 onto which the LEEs are arranged. FIG. 5B shows a top view of the substrate 511 and a subset of the multiple LEEs 512 distributed along the y-axis. The luminaire module 501 includes primary optics 520 (e.g., optical couplers corresponding to the LEEs 512), the light guide 530, and a secondary optic 540 (e.g., an optical extractor). Light that is guided by the light guide 530 in a collimated angular range 525 to the secondary optic 540 is redirected by a first portion 546 of a redirecting surface and then output from the optical extractor 540 of the luminaire module 501 through a first output surface 544. The light received at the secondary optic 540 in the collimated angular range 525 also is redirected by a second portion 546' of the redirecting surface and then output from the optical extractor 540 of the luminaire module 501 through a second output surface 544'. A mounting frame and attachment brackets can be used to position/attach the luminaire module 501 in a panel enclosure to provide a device for workspace illumination, for instance.

Further in this example, the mount 510 also supports a heat sink 507 coupled with the substrate 511. The heat sink 507 is configured to extract heat from the LEEs 512 held by the substrate 511. The luminaire module 501 can include 6, 60, 600 or other number of LEEs 512, for instance. A length of the light guide 530 along the z axis can be 0.1, 0.5, 1, or 2 meter, for instance. In the cross-section view of FIG. 5A, both portions 546, 546' of the redirecting surface are planar, and both output surfaces 544, 544' are concave (as viewed in the direction of propagation of light) in shape. In other implementations, both portions 546, 546' of the redirecting surface and the corresponding output surfaces 544, 544' are concave and/or convex. In general, various geometries (shapes, compositions, etc.) of the primary and secondary optics can be used to separately tailor the (orientation and divergence of the) angular ranges 542, 542' of the light output by the luminaire module 501.

The luminaire module 501 can be used to provide light from a device for workspace illumination in both the first angular range and in the second angular range.

Figure 6:
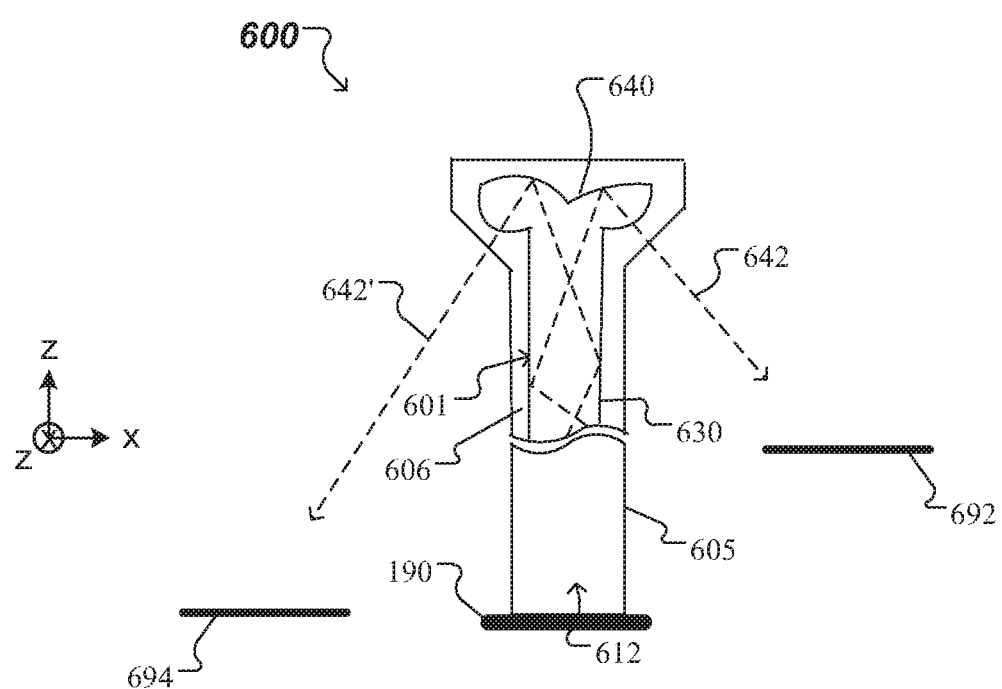
FIG. 6 shows a schematic cross-sectional view of another example of a device for workspace illumination.

FIG. 6 shows a schematic cross-sectional view of another example of a device 600 for workspace illumination that includes a luminaire module 601, such as a module 501 as described in connection with FIGS. 5A-5B. The luminaire module 601 is arranged in the panel enclosure 606.

A Cartesian coordinate system is shown for schematic reference. In this example, the coordinate system is oriented relative to the device 600 such that the device 600 as well as the luminaire module 601 therein are elongated along the y-axis, and light output by the device 600 in first and second angular ranges 642, 642' has a prevalent propagation direction with a non-zero component that is antiparallel to the z-axis. As such, the device 600 can provide illumination of a first target area 692, located on one side of the panel 605 (e.g., through a first aperture) and of a second target area 694, located on the other side of the panel 605 (e.g., through a second aperture.) Generally, the first and second target areas are spaced apart from the device 600.

The luminaire module 601 includes multiple LEEs 612 that are coupled with corresponding primary optics. The luminaire module 601 also includes a light guide 630 and a secondary optic 640. A length of the light guide 630 along the z-axis can extend through most of the height of the panel 605 (e.g., from the level of the apertures to a horizontal portion of the mount 190), or through a fraction of the height of the panel 605, e.g., 25%, 50%, 75%. As such, the LEEs 612 of the luminaire module 601 are represented in FIG. 6 by an arrow corresponding to LEEs 612, such that the direction of the corresponding arrow indicates that an emission angular range of the LEEs 612 is oriented along the z-axis.

In some implementations, geometries of the primary optics and the secondary optic of the luminaire module 601 can be selected such that the first and second angular ranges 642, 642' have different divergences and asymmetric prevalent propagation directions, for various illumination tasks on the two opposite sides of the device 600. In some implementations, the respective geometries of the primary and secondary optics of the luminaire module 601 can be selected such that first and second angular ranges 642, 642' have equal divergences but asymmetric prevalent propagation directions, or different divergences but symmetric prevalent propagation directions, for various illumination tasks that are different on the two opposite sides of the device 600. In some implementations, the respective geometries of the primary and secondary optics of the luminaire module 601 can be selected such that first and second angular ranges 642, 642' have equal divergences and symmetric prevalent propagation directions, for various illumination tasks that are similar on the two opposite sides of the device 600. In such cases, the luminaire module 601 can have mirror symmetry in the x-z cross-section with respect to the y-z plane, for instance.

As described herein, a single luminaire module or multiple luminaire modules can be placed in a panel enclosure to provide a desired illumination pattern of one or more target areas. FIGS. 7A-7D show various arrangements and configurations of luminaire modules 301 and 501 as described above within example devices for workspace illumination.

Figure 7A:
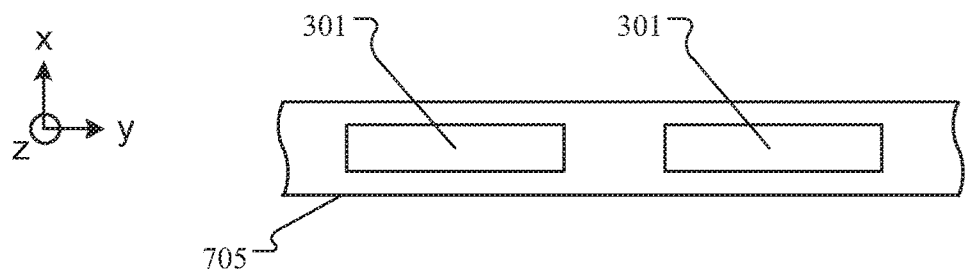
FIGS. 7A-7D show various arrangements and configurations of luminaire modules of a device for workspace illumination.
Figure 7B:
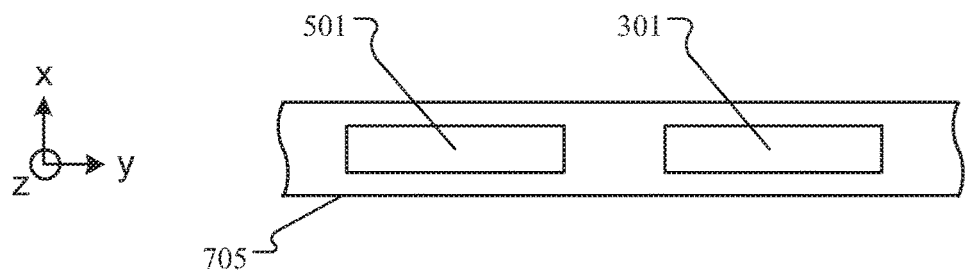
Figure 7C:
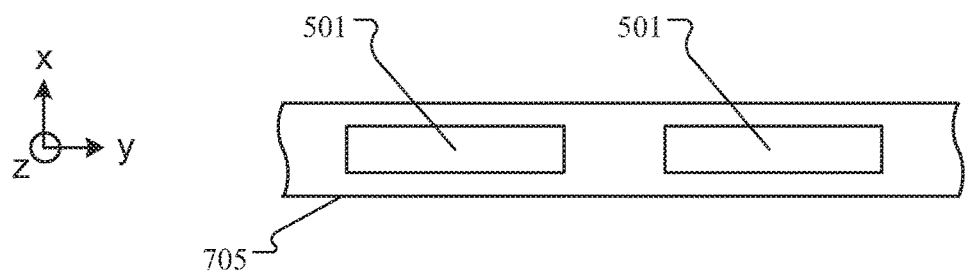
Figure 7D:
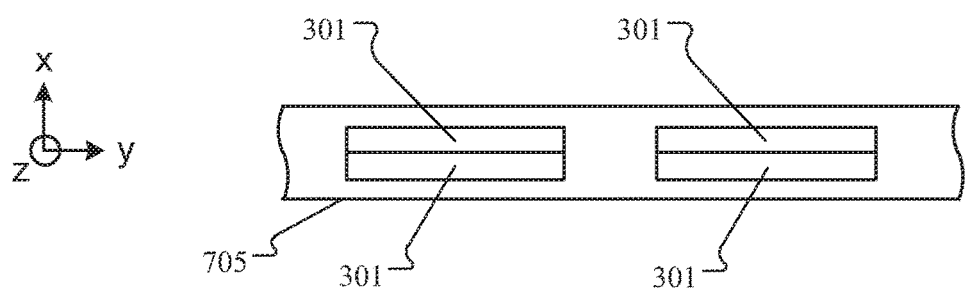

For example, FIG. 7A shows multiple luminaire modules 301 inside a panel 705. The luminaire modules can be arranged to output light towards the same or opposite side of the panel 705. FIG. 7B shows a combination of a luminaire module 501 and a luminaire module 301 inside the panel 705. The luminaire module outputs light towards both sides of the panel 705 and the luminaire module outputs light towards one side of the panel 705. FIG. 7C shows multiple luminaire modules 501 inside the panel 705. The luminaire modules 501 output light towards both sides of the panel 705. FIG. 7D shows multiple pairs of luminaire modules 301 inside the panel 705. Each pair of the luminaire modules 301 outputs light towards both sides of the panel 705. The light output of each luminaire module 301 can be controlled independently to provide, for example, a desired intensity and/or spectral distribution for each target area independently.

Properties of a luminaire module, such as luminaire modules 301 and 501, can be tailored to provide extraction profiles desirable for specific lighting applications. It is noted that the angular ranges may be defined relative to one or more directions or planes, for example the z-axis, a plane perpendicular to x or other direction whether parallel, perpendicular or oblique to axes of the Cartesian coordinate system. In general, the components of luminaire modules are arranged to redirect light emitted from the LEEs away from the LEEs before the light is output into the ambient environment. The spatial separation of the place of generation of the light, also referred to as the physical (light) source, from the place of extraction of the light, also referred to as the virtual light source or virtual filament, can facilitate design of the luminaire modules.

For example, in some implementations, the virtual light source/filament can be configured to provide substantially non-isotropic light emission with respect to planes parallel to an optical axis of the luminaire modules (for example the z-axis.) In contrast, a typical incandescent filament generally emits substantially isotropically distributed amounts of light. The virtual light source may be viewed as one or more portions of space from which substantial amounts of light appear to emanate. Furthermore, separating the LEEs, with their predetermined optical, thermal, electrical and mechanical constraints, from the place of light extraction, may facilitate a greater degree of design freedom of the optical system of the illumination modules and allows for an extended optical path, which can permit a predetermined level of light mixing before light is output from the luminaire modules.

In general, corresponding variety of different LEEs can be used for the luminaire modules. The LEEs may be, for example, light-emitting diodes (LEDs) (e.g., organic or inorganic LEDs) or other solid state light emitting devices, such as diode lasers.

In general, the luminaire module can be configured to generate light of a desired chromaticity. In many applications, luminaire modules are configured to provide broadband light. Broadband light can be generated using nominally white or off-white LEEs or colored LEEs whose emissions are mixed to provide white light. In some implementations, white light can be generated using an LEE configured to emit pump light (e.g., blue, violet or ultraviolet light) in conjunction with a wavelength conversion material. For example, in certain implementations, LEEs include GaN-based pump LEDs with an overlying phosphor layer (e.g., YAG) that creates yellow, red and/or green components to produce white light.

In some implementations, the luminaire modules can be configured to provide colored light (e.g., yellow, red, green, blue light). Different LEEs in the luminaire modules can be configured to emit nominally different light under operating conditions, for example yellow, red, green, blue, white or other color light.

In general, relatively energy efficient LEEs can be used. For example, LEEs can have an output efficiency of about 50 lm/W or more (e.g., about 75 lm/W or more, about 100 lm/W, about 125 lm/W or more, about 150 lm/W or more). In certain implementations, LEEs conduct current greater than about 350 mA (e.g., 400 mA or more, 450 mA or more, 500 mA or more). LEEs may be surface mount devices.

The number of LEEs in a luminaire module can vary. In some implementations, the luminaire module can include relatively few LEEs (e.g., 10 or fewer). In some implementations, the luminaire module can include a large number of LEEs (e.g., 100 or more). Generally, the luminaire module includes between 4 and 100 LEEs.

Each of the optical couplers can be configured to receive light from one or more of the LEEs through an entrance aperture of the optical coupler. In implementations that feature multiple optical couplers, the optical couplers may be integrally formed. Each optical coupler can be configured to provide a predetermined amount of light at an exit aperture of the optical coupler. For this purpose, each optical coupler is optically coupled with the corresponding LEEs and the light guide. Adjacent optical couplers may be optically isolated or optically coupled to control cross talk and/or collimation of light or other functions in one or more planes parallel to the optical axes of the optical couplers or in other directions.

The optical couplers can be configured to allow coupling of a predetermined amount of light from one or more of the LEEs into the optical couplers and a predetermined amount of that light is provided at the exit apertures of the optical couplers. Each optical coupler can be configured to transform light as it interacts with the optical coupler between the entrance aperture and the exit aperture. Such transformations, also referred to as conditioning, may be regarded as transformations of the phase space of light including collimation of light (e.g. causing a reduction of the divergence of the coupled light) or other transformations, and/or preservation of etendue, light flux and/or other parameters, for example.

In some implementations, the optical couplers are configured to provide light with predetermined properties to control light losses in other components of the illumination device, including one or more of the light guide, extractor or other components of the luminaire module. For example, the optical couplers can be configured so that substantially all light provided thereby can propagate through the light guide to the optical extractor, has less than a predetermined divergence, is injected into the light guide at suitable angles relative to the optical interfaces of the light guide or has other properties.

Optical couplers can include one or more optical elements including non-imaging dielectric TIR concentrators, such as CPC (compound parabolic concentrators), CECs (compound elliptical concentrators), CHC (compound hyperbolic concentrators), tapered or untapered portions, light pipes, segmented concentrators, other geometry concentrators, one or more lenses or other optical elements, for example. In some implementations, optical couplers and LEEs are integrally formed as a single component.

The illumination module may include a number of optical couplers with the same or different configuration. Optical couplers may have equal or different profiles or cross sections in different directions. In some implementations, optical couplers may have varying configurations depending on their location within a cluster or group of optical couplers. For example, optical couplers proximate the ends of an elongate illumination device may be configured with properties different from those of optical couplers near the center of the illumination device. Like considerations may apply in implementations in which the optical couplers are disposed in clusters proximate an optical axis. For example, optical couplers proximate the periphery of a cluster may be configured with properties different from those proximate the optical axis. An optical coupler may have rotationally symmetric and/or asymmetric cross sections, for example it may have parabolic, elliptical, circular, hyperbolic, triangular, square, rectangular, hexagonal or other regular or irregular polygonal or other cross sections.

A portion or all of the optical coupler may be made of a solid transparent body configured to propagate light internally and solely, partially or not at all, depending on whether a specular reflective coating is employed on the outside of the solid transparent body, rely on TIR, or may be configured to provide a through hole that is partially or fully reflectively coated on one or more optical surfaces. Like consideration may apply to the light guide, the optical extractors or other components of the illumination device, for example. Depending on the implementation, one or more optical couplers may be configured as hollow, reflectively coated non-imaging optical couplers. One or more of the optical couplers may include a dielectric collimating optic configured to provide a predetermined collimation angle. The collimation angle may be determined by the length and/or shape of respective surfaces of the optical coupler, for example. An optical coupler may be configured to provide substantially equal collimation about an optical axis in rotationally symmetrical configurations or may provide different collimation in different directions with respect to an optical plane of the optical coupler and/or other component of the illumination device, for example.

In general, light guide can have a regular or irregular prismatic, cylindrical, cuboid or other shape and include one or more light guide elements. Light-guide elements may be arranged in a line or a cluster that may or may not allow light to transmit between light-guide elements. Light-guide elements may be arranged in parallel with one light-guide element for each coupler. Such configurations may be integrally formed. Multiple light-guide elements may be arranged in a cluster, the light-guide elements of the cluster coupling light into one or more extractors. Multiple light-guide elements may be disposed abutting one another or placed apart at predetermined distances. The light guide and/or one or more light-guide elements may be integrally formed, modularly configured, arranged and/or durably disposed via a suitably configured interconnect system during manufacture, installation, servicing or other event.

The light guide and/or one or more light-guide elements may be configured to have one or more substantially reflective surfaces defining one or more mantles that extend from a first end to a second end of the light guide for enclosing and enabling optical confinement proximate an optical axis or optical plane along which the light guide can guide light with below predetermined light losses. One or more surfaces of the mantle may be substantially parallel, tapered or otherwise arranged. Such surfaces may be substantially flat or curved. Generally, the light guide can have elongate or non-elongate cross section with respect to an axes or planes of the illumination device. Non-elongate light-guides may be rotationally or otherwise symmetric about an optical axis.

The light guide is configured to guide light from the one or more optical couplers via its optical surfaces, by total internal reflection (TIR) and/or specular reflection. Mixing of the light in the light-guide elements may be achieved in part by the shape of the optical surfaces. The light guide may be configured to intermix light from different direct LEEs. In some implementations, the light guide is configured to mix light and to provide light with a predetermined uniformity in color and/or illuminance to the optical extractor.

In some implementations, the light guide has a hollow configuration having reflective optical surfaces on its inside that transmit light along the length of the hollow with predetermined light-loss properties. The reflectivity of the reflective optical surfaces may originate from or be enhanced by reflective coatings, films, layers or other reflective aids. The composition of and manner in which such reflective coatings may be disposed and/or manufactured would be readily known by a person skilled in the art.

Optical extractor is disposed at an end of the light guide opposite the optical coupler and includes one or more reflective interfaces that are configured to redirect light from the light guide outward away from the optical axis of the light guide towards and through one or more light-exit surfaces of the optical extractor into the ambient. Depending on the implementation, the directions of propagation of the output light may be parallel, antiparallel and/or oblique, that is backward and/or forward, with respect to the optical axis of the light guide.

The optical extractor may be configured to output one or more beams of light with predetermined intensity distributions (i.e., into specific ranges of solid angles). For example, different intensity distributions may be provided via different light-exit surfaces, for example on either side of an elongate optical extractor. The optical extractor and/or one or more portions thereof from which light appears to emanate under operating conditions may be referred to as a virtual light source. Depending on the implementations, the virtual light source can have an elongate or non-elongate configuration. The one or more beams may be symmetric or asymmetric with respect to the luminaire module. A non-elongate configuration may have rotational symmetry about an optical axis. The intensity distributions or one or more portions thereof may be configured to limit glare by limiting direct downward lighting to predetermined levels, for example.

In some implementations, the intensity distribution of the optical extractor, at least in part, may be determined by the configuration and disposition of the reflective interfaces relative to the light-exit surfaces of the optical extractor. The optical extractor may include one or more reflective interfaces having one or more flat or curved shapes including parabolic, hyperbolic, circular, elliptical or other shapes. In certain implementations, the optical extractor includes one or more reflective coatings to redirect light and provide a desired emission pattern. The reflective interface may have a linear, convex, concave, hyperbolic, linear segmented or other cross section shaped as a plurality of potentially disjoint, piecewise differentiable curves, in order to achieve a predetermined emission pattern.

In general, the optical extractor may provide symmetrical or asymmetrical beam distributions with respect to an optical axis or optical plane thereof. In elongate implementations the cross sections of reflective interfaces and/or light-exit surfaces may change along an elongate extension thereof. Such variations may be stepwise or continuous. For instance, the reflective interface of the optical extractor may have a first cross section shaped as a plurality of potentially disjoint, piecewise differentiable first curves, and a second cross section at a different location along the elongate extension of the reflective interface, such that the second cross section is shaped as a different plurality of potentially disjoint, piecewise differentiable second curves.

In certain implementations, the reflective optical interfaces may have a symmetrical or asymmetrical v-shaped or other cross section. A v-shaped cross section may also be referred to as a v-groove in elongate implementations or a conical cavity in non-elongate implementations. As used herein, the term "v-groove" refers to the v-shaped cross-section through the reflective optical interfaces, but does not require that the optical extractor include an actual groove. For example, in some implementations, the optical extractor includes two portions of solid material that meet at a v-shaped interface. Such an interface is also referred to as a v-groove. Depending on the implementation, a v-groove may have substantially equal cross section along a length of the optical extractor or it may vary depending on the position along the elongate extension. The first apex formed by such v-shaped reflective interfaces may be generally directed towards the light guide. In addition, the sides forming the v-groove may have linear cross-sections, or may be non-linear (e.g., curved or faceted). Moreover, the first apex of the reflective optical interfaces can be a rounded vertex (or apex) with a non-zero radius of curvature.

Generally, the optical extractor can be integrally or modularly formed with the light guide. The optical extractor may be formed of one or more materials equal, similar or dissimilar to that of the light guide and include one or more different materials. Depending on the implementation, the optical extractor may be configured to redirect light via TIR, specular and/or diffuse reflection, for example, via a dielectric or metallic mirror surface, refraction and/or otherwise. The optical extractor may include one or more coatings including one or more films of suitable dielectric, metallic, wavelength conversion material or other material. Depending on the implementation, a modularly formed optical extractor and light guide may include or be interconnected with suitable connectors for durable interconnection and optional registration during manufacture, assembly, service or other event. Different modular optical extractors may have different configurations to provide different lighting properties. To improve optical and/or mechanical performance, a coupling between the optical extractor and the light guide may be established by employing one or more suitably transparent compounds with predetermined refractive indices. Such compounds may include at least initially fluid substances such as silicone or other curable or non-curable substances. Such substances may provide an adhesive function.

Each of the light-exit surfaces and/or the reflective interfaces of the optical extractor may include one or more segments, each having a predetermined shape including convex, concave, planar or other shape. Shapes of the light-exit surface and/or the reflective interfaces can be determined to provide predetermined levels of light extraction via the optical extractor and to limit light losses due to back reflection and/or absorption of light within the optical extractor.

The term "optical axis" is used herein to refer to an imaginary line that defines a path along or proximate which light propagates. An optical axis may correlate with one or more axes or planes of symmetry of components of an optical system or apparatus. A plurality of optical axes that refer to a planar or non-planar notional surface may be referred to herein as an optical plane. The term "rotational symmetry" is used herein, as the case may be, to refer to invariance under discrete or continuous rotation.

The term "light-emitting element" (LEE), also referred to as a light emitter, is used to define any device that emits radiation in one or more regions of the electromagnetic spectrum from among the visible region, the infrared region and/or the ultraviolet region, when activated. Activation of an LEE can be achieved by applying a potential difference across components of the LEE or passing a current through components of the LEE, for example. A light-emitting element can have monochromatic, quasi-monochromatic, polychromatic or broadband spectral emission characteristics. Examples of light-emitting elements include semiconductor, organic, polymer/polymeric light-emitting diodes (e.g., organic light-emitting diodes, OLEDs), other monochromatic, quasi-monochromatic or other light-emitting elements. Furthermore, the term light-emitting element is used to refer to the specific device that emits the radiation, for example a LED die, and can equally be used to refer to a combination of the specific device that emits the radiation (e.g., a LED die) together with a housing or package within which the specific device or devices are placed. Examples of light emitting elements include also lasers and more specifically semiconductor lasers, such as vertical cavity surface emitting lasers (VCSELs) and edge emitting lasers. Further examples include superluminescent diodes and other superluminescent devices.

The term "light-converting material" (LCM), also referred to as "wavelength-conversion material," is used herein to define a material that absorbs photons according to a first spectral distribution and emits photons according to a second spectral distribution. The terms light conversion, wavelength conversion and/or color conversion are used accordingly. Light-converting material may be referred to as photoluminescent or color-converting material, for example. Light-converting materials may include photoluminescent substances, fluorescent substances, phosphors, quantum dots, semiconductor-based optical converters, or the like. Light-converting materials may include rare earth or other materials including, for example, Ce, Yt, Te, Eu and other rare earth elements, Ce:YAG, TAG, nitride, oxynitride, silicate, CdSe quantum dot material, AlInGaP quantum dot material. As used herein, an LCM is typically configured to generate longer wavelength light from pump light such as visible light or ultraviolet pump light, for example. Different LCM may have different first and/or second spectral distributions.

As used herein, the term "optical interface" refers to the interface between two media having different optical properties. Examples of optical interfaces include a surface of an optical element (i.e., the interface between the medium forming the optical element and the ambient atmosphere), the interface between adjacent optical elements, and the interface between an optical element and a coating disposed on the elements surface.

As used herein, the term "optical power" (also referred to as dioptric power, refractive power, focusing power, or convergence power) is the degree to which a lens, mirror, or other optical system converges or diverges light.

As used herein, providing light in an "angular range" refers to providing light that propagates in a prevalent direction and has a divergence with respect to the prevalent direction. In this context, the term "prevalent direction of propagation" refers to a direction along which a portion of an intensity distribution of the propagating light has a maximum. For example, the prevalent direction of propagation associated with the angular range can be an orientation of a lobe of the intensity distribution. Also in this context, the term "divergence" refers to a solid angle outside of which the intensity distribution of the propagating light drops below a predefined fraction of a maximum of the intensity distribution. For example, the divergence associated with the angular range can be the angular width of the lobe of the intensity distribution. The predefined fraction can be 10%, 5%, 1%, or other values, depending on the lighting application.

An angular range may include (i) a divergence of the angular range and (ii) a prevalent direction of propagation of light in the angular range, where the prevalent direction of propagation corresponds to a direction along which a portion of an emitted light intensity distribution has a maximum, and the divergence corresponds to a solid angle outside of which the intensity distribution drops below a predefined fraction of the maximum of the intensity distribution. E.g., the predefined fraction is 5%.

The terms "collimation" and "collimate" are used herein to refer to the degree of alignment of rays of light or the act of increasing such alignment including the reduction of divergence of the propagation directions of a plurality of light rays, also referred to as a beam of light, or simply light.

Unless defined otherwise, all technical and scientific terms used herein have the same meaning as commonly understood by one of ordinary skill in the art to which this technology belongs.

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, as long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

What is claimed is:

1. An illumination device comprising:
   a mount;
   a panel comprising a first face and a second opposing face forming an enclosure, the first and second faces extending in a first direction and a second direction perpendicular to the first direction, wherein, when mounted to a floor, the mount supports the panel so that the first direction is a vertical direction and the second direction is a horizontal direction; and
   a luminaire module arranged in the enclosure, the luminaire module configured and arranged to output light towards respective target areas proximate to the first and the second face of the panel,
   the luminaire module comprising:
   a plurality of light-emitting elements (LEEs) distributed along the second direction, the plurality of LEEs being configured to emit light;

one or more primary optics coupled with one or more corresponding LEEs of the plurality of LEEs and configured to redirect light emitted by the one or more corresponding LEEs as redirected light; and a secondary optic elongated along the second direction and comprising two redirecting surfaces and two output surfaces corresponding to the respective redirecting surfaces, each of the two redirecting surfaces being arranged and configured to reflect the light received from the one or more primary optics as reflected light towards the corresponding output surface, and the corresponding output surface being arranged and configured to refract the reflected light and to output the refracted light towards the respective target area.

2. The illumination device of claim 1, wherein the luminaire module is configured to output the light towards the respective target area proximate to the first face of the panel in an angular range with different divergence and asymmetric prevalent propagation direction than an angular range of the light output towards the respective target area proximate to the second face of the panel.

3. The illumination device of claim 1, wherein the luminaire module is configured to output light downward within +/−40 degrees relative to the panel.

4. The illumination device of claim 1, wherein the luminaire module further comprises a light guide elongated along the second direction and disposed between the one or more primary optics and the secondary optic, the light guide configured to receive the redirected light and guide at least some of the received light along the first direction and provide the guided light at a distal end of the light guide to the secondary optic.

5. The illumination device of claim 1, wherein
the first face of the panel has a first aperture located proximate a distal end of the panel with respect to a portion of the mount along the second direction, and wherein the light that is output by the luminaire module towards the one of the target areas proximate to the first face of the panel passes through the first aperture, and
the second face of the panel has a second aperture located proximate the distal end of the panel, wherein the light that is output by the luminaire module towards the one of the target areas proximate to the second face of the panel passes through the second aperture.

6. The illumination device of claim 5, wherein each of the first aperture and the second aperture is elongated along the second direction.

7. The illumination device of claim 5, wherein at least one of the first aperture and the second aperture comprises glass.

8. The illumination device of claim 1, wherein a thickness of the panel is smaller than each of the second direction and the first direction of the first and second faces.

9. The illumination device of claim 1, wherein the panel is at least a portion of one of a cubical wall, a desk partition, a room partition, a wall panel, or an element of a piece of furniture.

10. The illumination device of claim 1, wherein a portion of the mount is configured to couple to the panel along the second direction.

11. The illumination device of claim 1, wherein a portion of the mount is configured to couple to a top of the panel.

12. The illumination device of claim 11, wherein the illumination device is detachable from the panel.

\* \* \* \* \*